(12) United States Patent
Nishimura et al.

(10) Patent No.: US 7,331,245 B2
(45) Date of Patent: Feb. 19, 2008

(54) PRESSURE DISTRIBUTION SENSOR AND SENSING METHOD

(75) Inventors: Ken A Nishimura, Fremont, CA (US); Ian Hardcastle, Sunnyvale, CA (US)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 112 days.

(21) Appl. No.: 11/286,193

(22) Filed: Nov. 22, 2005

(65) Prior Publication Data

US 2007/0113681 A1 May 24, 2007

(51) Int. Cl.
*G01L 3/00* (2006.01)
*G01L 1/16* (2006.01)

(52) U.S. Cl. .................. 73/862.046; 73/818
(58) Field of Classification Search ........... 73/862.046, 73/818, 862.04; 345/174
See application file for complete search history.

(56) References Cited

U.S. PATENT DOCUMENTS

| | | | |
|---|---|---|---|
| 5,010,772 A * | 4/1991 | Bourland et al. | 73/862.046 |
| 5,237,879 A * | 8/1993 | Speeter | 73/862.041 |
| 5,463,388 A * | 10/1995 | Boie et al. | 341/33 |
| 5,583,303 A * | 12/1996 | Franz | 73/862.046 |
| 5,760,530 A * | 6/1998 | Kolesar | 310/339 |
| 5,841,078 A * | 11/1998 | Miller et al. | 178/18.06 |
| 5,889,236 A * | 3/1999 | Gillespie et al. | 178/18.01 |
| 6,222,528 B1 * | 4/2001 | Gerpheide et al. | 345/173 |
| 7,135,645 B2 * | 11/2006 | Hiraki et al. | 177/25.13 |
| 2004/0252109 A1 * | 12/2004 | Trent et al. | 345/174 |
| 2006/0279548 A1 * | 12/2006 | Geaghan | 345/173 |

* cited by examiner

*Primary Examiner*—Edward Lefkowitz
*Assistant Examiner*—Jonathan Dunlap

(57) ABSTRACT

A spatial pressure distribution sensor comprises a sensor array and a processor. The sensor array comprises an array of pressure sensors. Each of the pressure sensors is operable to generate a respective pressure signal in response to pressure applied to it. The pressure signal quantifies the pressure with greater than single-bit resolution. The processor is operable in response to the pressure signals to generate an information signal representing the spatial distribution of pressure applied to the sensor array.

26 Claims, 5 Drawing Sheets

PRESSURE DISTRIBUTION SENSOR AND SENSING METHOD

BACKGROUND

Traditional cursor control devices for controlling movement of a cursor on the display of an electronic device include arrow keys, function keys, mice, track balls, joysticks, j-keys, touchpads, touch screens, light pens, tablets and other similar devices. Although these traditional cursor control devices are generally satisfactory for many applications, in environments in which the cursor control device must operate in a limited workspace and fit within a specific form factor of an electronic device, such as that of a laptop computer, hand held computer, personal digital assistant (PDA), wireline or wireless telephone, video game or other similar electronic device, traditional cursor control devices do not provide sufficient cursor control accuracy.

For example, conventional touchpads commonly implemented in laptop and hand held computers comprise an array of binary pressure sensors. Each binary pressure sensor outputs a binary signal whose state indicates whether the pressure applied to the pressure sensor is greater than or less than a threshold pressure. From the binary signals, a contact region of the touchpad is identified. The contact region is the region of the touchpad in which the pressure applied by the user's finger is greater than the threshold. The position of the contact region is then computed and is used to determine the position of the cursor on the display. Alternatively, the change between the position of the current contact region and the position of a previous contact region is used to determine a change in the position of the cursor on the display.

However, on most touchpad surfaces, the difference in the static and sliding coefficients of friction between the user's finger and the touchpad surface makes it difficult for the user to control small or precise cursor movements. In general, to move his or her finger relative to the touchpad surface, the user must apply sufficient force to overcome the static coefficient of friction. In many cases, the difference between the static coefficient of friction and the sliding coefficient of friction on the touchpad surface causes the user to apply excessive force and, therefore, "overshoot" the desired finger position on the touchpad surface. As a result, attempts by the user to make small or precise movements of the user's finger relative to the touchpad surface produce unpredictable results in the computation of the location of the centroid of the contact region on the touchpad, and hence in the location of the cursor on the display.

There is therefore a need for the ability to detect the position of an applied pressure with greater precision and resolution.

DETAILED DESCRIPTION

Figure 0A:
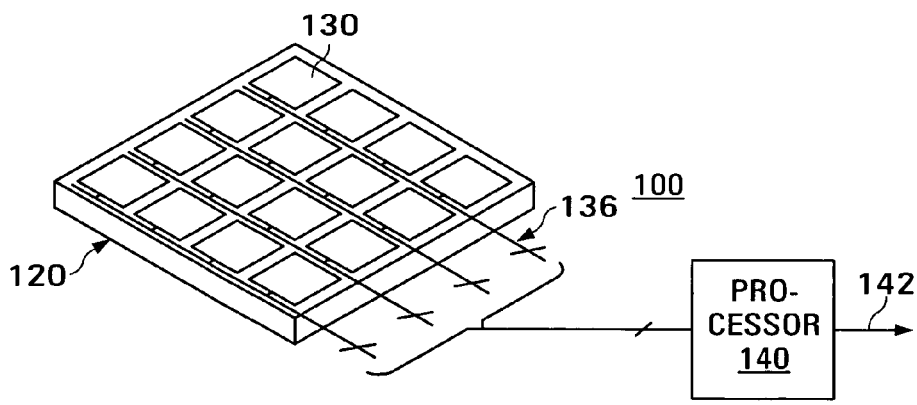
FIG. 0A is an isometric view showing an example of a pressure distribution sensor in accordance with an embodiment of the invention.

FIG. 0A is a schematic drawing showing an example of a pressure distribution sensor 100 in accordance with an embodiment of the invention. Pressure distribution sensor 100 is composed of a sensor array 120 and a processor 140. Sensor array 120 is composed of an array of pressure sensors. A representative pressure sensor is shown at 130. In the example shown in FIG. 0A, the pressure sensors are arranged in a rectangular array in sensor array 120. Other arrangements are possible. For example, the pressure sensors may be arranged in one or more circular arrays, as will be described in more detail below. Regardless of the arrangement of the pressure sensors, in typical embodiments, sensor array 120 is typically composed of many more pressure sensors than the 16 pressure sensor shown in FIG. 0A.

Figure 0B:
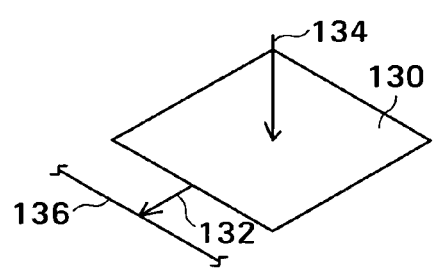
FIG. 0B is an enlarged isometric view showing one of the pressure sensors of the pressure distribution sensor shown in FIG. 0A.

FIG. 0B is a schematic drawing showing pressure sensor 130 in more detail. Pressure sensor 130 generates a pressure signal 132 in response to a pressure 134 applied to it. Pressure signal 132 quantifies applied pressure 134 with greater than single-bit resolution. In some embodiments, pressure signal 132 is an analog signal that can be regarded as quantifying applied pressure 134 with a resolution equivalent to an infinite number of bits. In other embodiments, pressure signal 132 is digital signal that represents the applied pressure using two or more bits.

Pressure sensor 130 outputs pressure signal 132 to processor 140. In the example shown in FIG. 0A, sensor array 120 is additionally composed of busses that connect the pressure sensors to the processor. A representative bus is shown at 136. A bus may be provided extending from each pressure sensor in sensor array 120 to processor 140. Alternatively, and more typically, a multiplexing scheme is used, as will be described in more detail. This allows a single bus or set of busses to serve all the pressure sensors in each row or each column of sensor array 120.

Processor 140 receives the pressure signals generated by the pressure sensors constituting sensor array 120 and processes the pressure signals to generate an information signal 142. Information signal 142 represents the spatial distribution of pressure applied to sensor array 120. In an embodiment in which processor 140 performs minimal processing, processor 140 simply arranges the pressure signals in a predetermined order and outputs them. The order in which the pressure signals are arranged is typically the order of a raster scan of the pressure sensors constituting sensor array 120. In another embodiment, processor 140 arranges the pressure signals in a zigzag scan order. In this case, the processor may additionally compress the pressure signals by applying run length coding, known in the data compression art.

In some embodiments, the spatial distribution of pressure represented by information signal 142 is simplified such that information signal represents the effective position at which pressure is applied to sensor array 120. For example, in an embodiment in which the sensor array is a rectangular array, information signal 142 represents the effective position at which the pressure is applied in terms of Cartesian coordinates. In an embodiment in which the sensor array is a circular array, an example of which will be described below, information signal 142 represents the effective position at which the pressure is applied in terms of polar coordinates.

In an embodiment in which pressure distribution sensor 100 is used as a position sensor, the spatial distribution of the pressure applied to sensor array 120 represents the position on sensor array 120 of an object that applies the pressure to the sensor array. In such embodiment, information signal 142 represents the position of the object on the sensor array. An embodiment of pressure distribution sensor 100 in which information signal 142 represents the position of an object on sensor array 120 will be referred to as a position sensor, and the information signal will be referred to as a position signal. In such an embodiment, processor 140 receives the pressure signals from sensor array 120 and, in response to the pressure signals and an appropriate position-indicating metric, determines the position of the object on sensor array 120.

In one example, the position-indicating metric used by processor 140 to determine the position of the object on sensor array 120 is the location in the sensor array of the pressure sensor whose pressure signal is greater in level than the pressure signals of the remaining pressure sensors. Such a pressure signal indicates the greatest applied pressure. With this position-indicating metric, the position signal typically represents the position of the object on the sensor array using the coordinates of the identified pressure sensor in the sensor array. In a position detector in which sensor array 120 is a rectangular array, the position of the object is typically represented using Cartesian coordinates. In a position detector in which sensor array 120 is a circular array, the position of the object is typically represented using polar coordinates.

In some embodiments of position sensor 100, each pressure signal represents the pressure applied to the respective pressure sensor using relatively few bits. In such embodiments, two or more of the pressure sensors constituting sensor array 100 may generate respective pressure signals of the same level that is greater the levels of the pressure signals generated by the remaining pressure sensors. An example of a position-indicating metric suitable for use in such embodiments is the position in the sensor array of the centroid of the area occupied by the pressure sensors whose pressure signals are greater in level than all of the remaining pressure signals. Processor 140 identifies the pressure sensors whose respective pressure signals are greater in level than all of the remaining pressure signals and identifies the locations of these pressure sensors in the sensor array. Using the location information, the processor calculates the position in the sensor array of the centroid of the area occupied by the identified pressure censors. Algorithms for calculating the position of the centroid of an area from a set of identified locations are known in the art and may be used. With this position-indicating metric, the position signal typically represents the position of the object on the sensor array using the coordinates of the location of the centroid in the sensor array. In this case, the coordinates may have non-integer values.

In yet another example, the position-indicating metric is the position in the sensor array of the center of pressure of the spatial pressure distribution represented by the pressure signals generated by the pressure sensors constituting sensor array 120. Algorithms for calculating the location of a center of pressure from a set of pressure signals originating from defined locations are known in the art and may be used. The calculation process may be simplified by first discarding the pressure signals that represent an applied pressure of zero. With this position-indicating metric, the position signal typically represents the position of the object on the sensor array using the coordinates of the position of the center of pressure in the sensor array. The coordinates may have non-integer values.

Position-indicating metrics different from those exemplified above may be used.

Figure 0C:
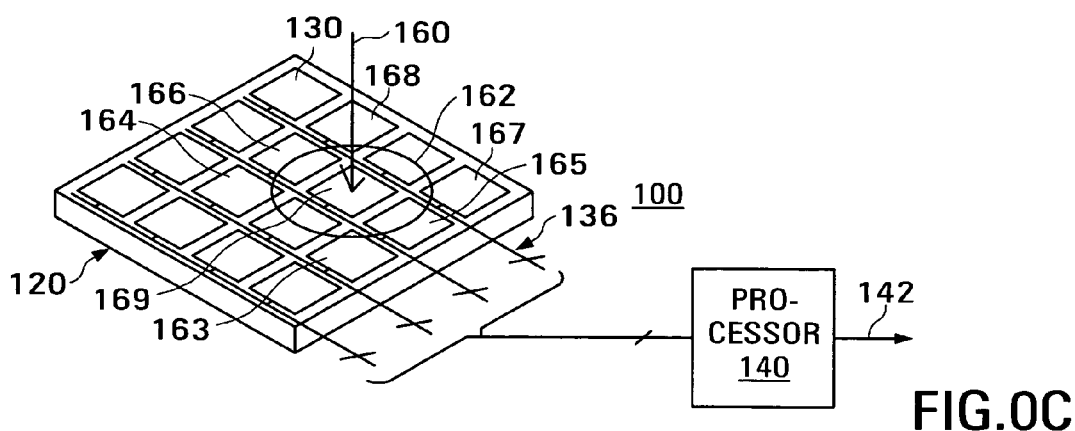
FIG. 0C is an isometric view of the pressure distribution sensor shown in FIG. 0A with a symmetrically-distributed pressure applied to its sensor array.
Figure 0D:
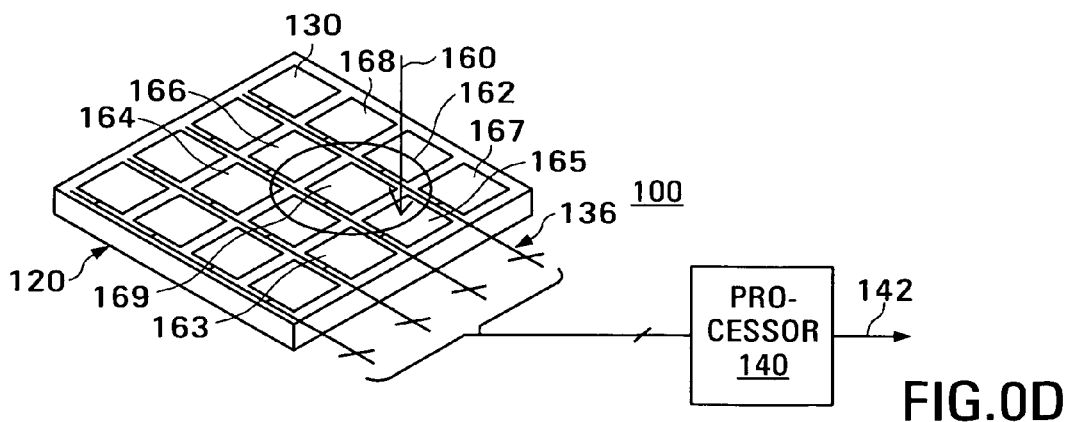
FIG. 0D is an isometric view of the pressure distribution sensor shown in FIG. 0A with an asymmetrically-distributed pressure applied to its sensor array.

Representing the pressure applied to each pressure sensor with a respective pressure signal having greater than single-bit resolution and, in response to the pressure signals and a position-indicating metric, determining the location of the object on the sensor array, as described above, allows position signal 142 to indicate subtle changes in the location of the object on the sensor array. FIGS. 0C and 0D show two examples in which pressure is applied to sensor array 120 by applying a force 160 to an area 162 that overlaps several of the pressure sensors of the sensor array. Force 160 is applied to the center of area 162 in the example shown in FIG. 0C so that the resulting spatial pressure distribution is substantially symmetrical. Force 160 is applied to area 162 off-center in the example shown in FIG. 0D so that the resulting spatial pressure distribution is asymmetrical.

FIGS. 0C and 0D will be further described with reference to an example in which the position-indicating metric is the position in sensor array 120 of the center of pressure of the spatial pressure distribution applied by the object to the sensor array. Similar results are obtained with the other examples of the position-indicating metric described above. In the example shown in FIG. 0C, the pressure signals generated by pressure sensors 163, 165 and 167 indicate applied pressures similar to those generated by pressure sensors 164, 166 and 168, respectively. Consequently, processor 140 calculates the position of the center of pressure substantially coincident with the physical center of pressure sensor 169. In the example shown in FIG. 0D, the pressure signals generated by pressure sensors 163, 165 and 167 indicate greater applied pressures than those generated by pressure sensors 164, 166 and 168, respectively. Consequently, processor 140 calculates the position of the center of pressure at a point displaced towards pressure sensor 165 from the physical center of pressure sensor 169.

If conventional binary pressure sensors were substituted for the pressure sensors in sensor array 120, the respective position signals in the examples shown in FIGS. 0C and 0D would typically indicate the same position in the sensor array. The pressure signal would only indicate a different position in the example shown in FIG. 0D if force 160 were applied sufficiently far from the center of area 162 as to cause the pressure applied to pressure sensors 164, 166 and 168 to fall below the threshold pressure of these pressure sensors.

The ability of position sensor 100 to detect subtle changes in pressure distribution, for example, subtle changes in the location of the center of pressure applied to sensor array 120, allows the precise, high spatial resolution position information represented by position signal 142 to be used by a host device to control the position of another real or virtual object. To avoid confusion between objects, the object whose position is determined by the position sensor will be referred to as a master object and the object whose position is controlled will be referred to as a slave object.

In an example, the host device is a laptop computer, the master object is a user's finger and the slave object is a virtual object, namely, a cursor displayed on the display of the host device. In this example, the user can make large-scale changes in the position of the cursor simply by sliding his or her finger over the surface of sensor array 120, as in a conventional touchpad. Additionally, the user can make precise, small-scale changes in the position of the cursor by keeping his or her finger in one position on sensor array 120, and changing the position of the center of pressure applied by his or her finger to sensor array 120. Changing the location of the center of pressure involves the user using a rocking motion in which the user's finger does not slide relative to the surface of the sensor array. The rocking motion avoids the above-mentioned problems arising from the difference between the static and dynamic coefficients of friction. The rocking motion of the user's finger applies a lateral motive force to the surface of the sensor array that never exceeds the resistive force resulting from the static coefficient of friction. Using this rocking motion, the user is able to change the location of the center of pressure in a manner similar that illustrated in FIGS. 0C and 0D, and position sensor 100 is able to detect this change with great precision.

Figure 1:
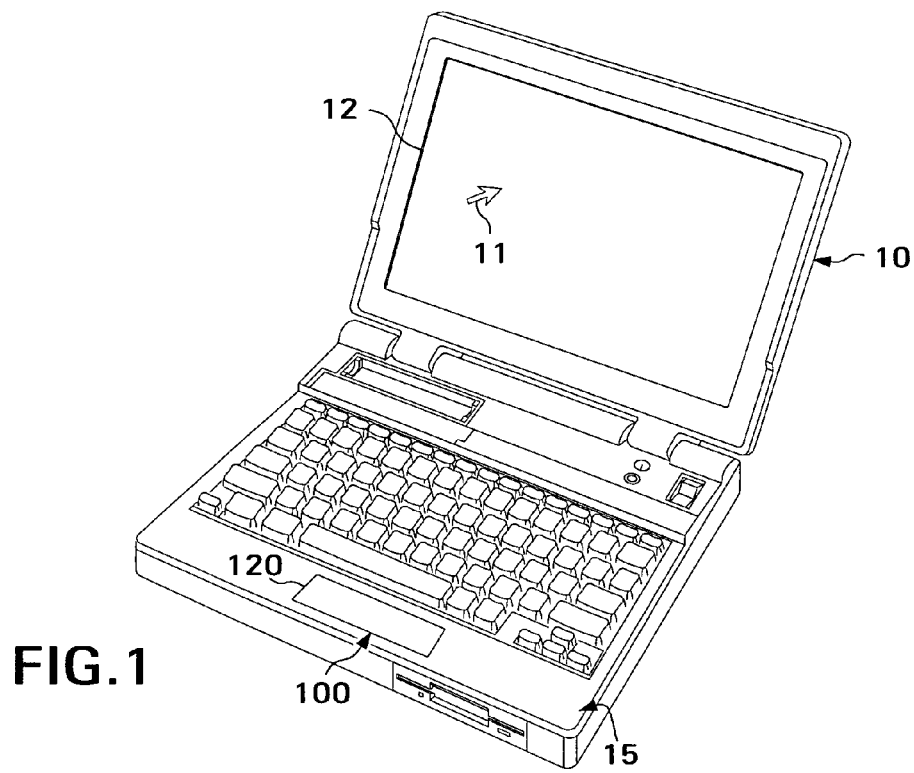
FIG. 1 is an isometric view showing an example of host device having a position detector that incorporates a pressure distribution sensor in accordance with an embodiment of the invention.

FIG. 1 shows a host device 10 comprising an example of position sensor 100 in accordance with an embodiment of the invention. Position sensor 100 provides a position signal to host device 10. The position signal represents the position of the master object on the sensor array 120 of position sensor 100 and is used by the host device to control the position of a slave object. In the example shown in FIG. 1, the slave object, i.e., the object whose position host device 10 controls in response to the position signal provided by position sensor 100, is a cursor 11 displayed on the display 12 of the host device. In other applications, the host device can use the position signal provided by position sensor 100 to control the position of any moveable slave object, real or virtual. By way of example, but not limitation, the host device can use the position signal to control the position of a character in a video game, to control the attitude of an aircraft in a flight simulator or of a real aircraft, or to direct loading of a container onto a container ship. By extension, a movement signal provided by an embodiment of position sensor 100 in addition to or instead of the position signal may be used by the host device to control the motion of the slave object.

FIG. 1 shows a laptop computer as an example of host device 10. However, any type of electronic device capable of using a position signal to control either or both of the position and the movement of a real or virtual object may incorporate an embodiment of position sensor 100. Exemplary host devices 10 include wireless (cellular) telephones, personal digital assistants (PDAs), notebook computers, hand-held video game devices, video game controllers, portable music players, flight simulators, stand-alone position controllers, the user interface of a dockyard crane and other electronic devices.

FIG. 1 shows position sensor 100 integrated into the top surface 15 of host device 10. However, in other embodiments, position sensor 100 is located on a side surface, the front surface, the back surface or the bottom surface of host device 10. In other types of host device, position sensor 100 constitutes all or part of a stand-alone electronic device (not shown) in communication with the host device 10. For example, position sensor 100 can constitute part of a mouse-type device, a remote control, a keyboard or other similar device.

In some embodiments, the position signal provided by position sensor 100 to host device 10 simply represents the position of the master object on sensor array 120 and is used by a position controller that constitutes part of the host device to control the position of the slave object. In other embodiments, position sensor 100 additionally performs at least part of a position control function, and the position signal directly defines the position in which host device is to locate the slave object.

Position sensor 100 may have any configuration suitable for its intended application as long as its constituent pressure sensors are capable of generating pressure signals that quantify applied pressure with greater than single-bit resolution. In the example shown in FIG. 1, position sensor 100 is configured similarly to a conventional touchpad, but its pressure sensors generate the above-mentioned multi-bit pressure signals. In another example, position sensor 100 is configured as a touch screen but its pressure sensors generate the above-mentioned multi-bit pressure signals. In another example, position sensor 100 is configured as a slidepad that includes a puck that is moveable in response to a lateral force applied in a direction generally parallel to the top surface 15 of host device 10. An example of a slidepad-based position sensor will be described below with reference to FIG. 8.

In operation, the user applies pressure to sensor array 120 of position sensor 100 using the master object, e.g., the user's finger or a stylus. In sensor array 120, the pressure sensors sense the respective pressures applied to them by the master object and generate respective pressure signals. From the pressure signals and an appropriate position-indicating metric, processor 140 determines the position of the master object on the sensor array, and generates the position signal representing the position of the master object.

Some host devices have a position controller that controls the position of the slave object in response to a movement signal instead of the above-described position signal. Processor 140 may be configured to generate such a movement signal in addition to or instead of position signal 142. The movement signal represents the movement of the master object relative to sensor array 120 in a predetermined time interval, e.g., between consecutive clock pulses. In embodiments of position sensor 100 that generate a movement signal, processor 140 uses values of the above-described position signal generated at the beginning and the end of the time interval to determine a change in the position of the master object during the time interval. The processor then generates a movement signal representing the change in the position of the master object. The movement signal is analogous to the movement signal generated by a conventional mouse and may be used, for example, by a movement controller that forms part of host device 10 to move the position of the cursor 11 incrementally on the display 12.

For example, in one embodiment, processor 140 determines from the values of the position signal generated at the beginning and the end of the time interval the magnitude and direction of a movement vector that represents the change in the position of the master object during the time interval. The processor generates the movement signal to represent the magnitude and direction of the movement vector. Position sensor 100 provides the movement signal to host device 10. In response to the movement signal, the position controller (not shown) that forms part of the host device moves the cursor 11 from its position on display 12 corresponding to the position of the master object on sensor array 120 at the beginning of the time interval to a new position on display 12 corresponding to the position of the master object on sensor array 120 at the end of the time interval.

Figure 2:
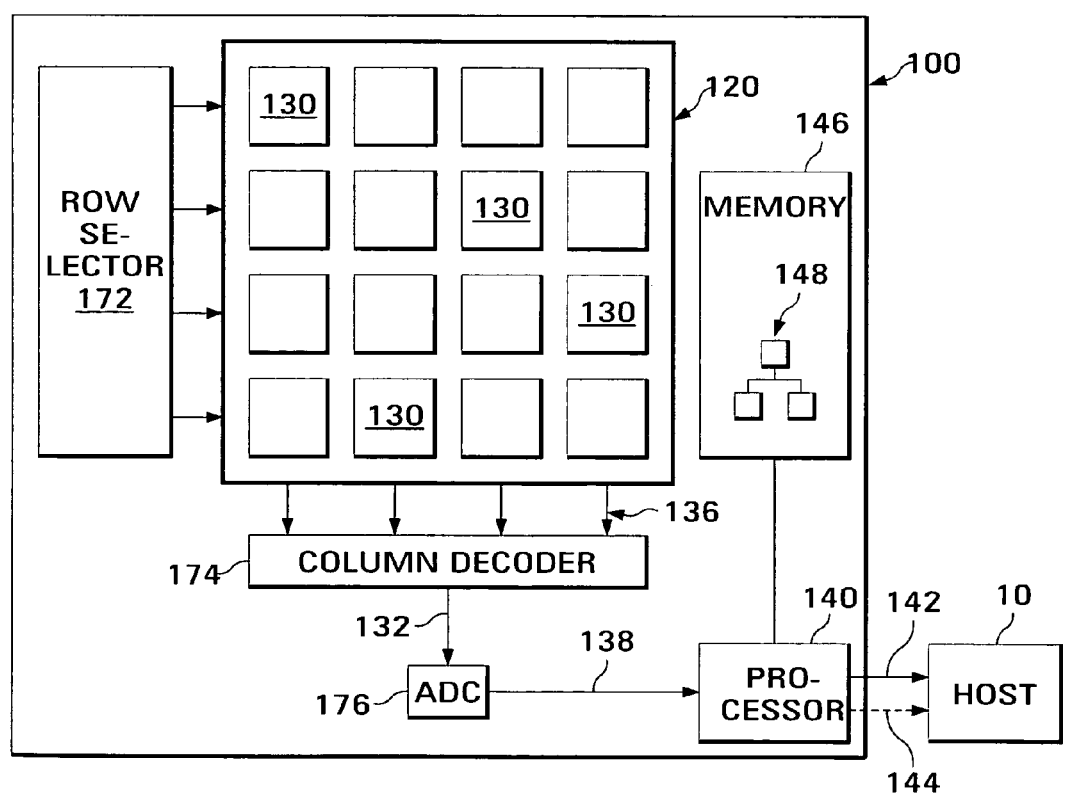
FIG. 2 is a block diagram showing a more detailed example of a pressure distribution sensor in accordance with an embodiment of the invention in which the pressure sensors are arranged in a two-dimensional array.

FIG. 2 shows a more detailed view of an exemplary embodiment of position sensor 100. As described above in connection with FIG. 0A, in position sensor 100, sensor array 120 includes an array of pressure sensors, each capable of producing a respective pressure signal that quantifies the pressure applied to that pressure sensor with greater than single-bit resolution. In FIG. 2, the pressure sensors are shown as pressure sensors 130, and are arranged in rows and columns. Each pressure sensor 130 produces a respective analog pressure signal that quantifies the pressure, if any, applied to it by the master object. Each pressure sensor has an output (not shown) by means of which the pressure sensor outputs its respective analog pressure signal. Row selector 172 sequentially selects the rows of pressure sensors. The pressure signals generated by all the pressure sensors in the selected row are output onto respective column busses 136 connected to column decoder 174. Column decoder 174 receives from column busses 136 the pressure signals output by the pressure sensors in the selected row and serializes the pressure signals.

An analog-to-digital converter (ADC) 176 receives the analog pressure signals 132 serially output by column decoder 174 and converts them to respective digital pressure signals 138. Each digital pressure signal has at least three possible values. One of the at least three possible values may be zero, representing an applied pressure of zero, for example. Typically, ADC 176 is a six-bit or eight-bit ADC, and the digital pressure signals 138 quantify the respective applied pressures with a resolution of 6 or 8 bits, respectively. Alternatively, each pressure sensor 130 may output its pressure signal as a digital pressure signal having at least three possible values.

In position sensor 100, processor 140 is connected to receive digital pressure signals 138 from sensor array 120. Processor 140 is connected to a memory device 146. Alternatively, memory device 146 may constitute part of the processor 140. In response to instructions 148 stored in memory device 146, processor 140 controls the operation of position sensor 100. Additionally, processor 140 operates in response to pressure signals 138 to determine a spatial pressure distribution of the pressure applied to sensor array 120 by the master object. The processor applies an appropriate position-indicating metric to the spatial pressure distribution to generate From the determined spatial pressure distribution, processor 140 generates information signal 142 that represents the spatial distribution of pressure applied to sensor array 140. In some embodiments, information signal 142 is a position signal and represents a spatial distribution of pressure that indicates the position of the master object on sensor array 120. In this case, processor 140 applies an appropriate position-indicating metric to the spatial pressure distribution to determine the position of the master object on the sensor array. Processor 140 outputs signal 142 to host device 10.

As noted above, instead of or in addition to outputting position signal 142, processor 140 may additionally operate to generate from successive values of position signal 142 a movement signal 144 that indicates the magnitude and direction of movement of the master object relative to sensor array 120 during a specified time interval. Processor 140 outputs movement signal 144 to host device 10 in addition to or instead of position signal 142. The host device operates in response to either or both of position signal 142 and movement signal 144 to position or move the slave object (cursor 11 on the display 12 in the example shown in FIG. 1) in response to the position or movement of the master object. Thus, processor 140 processes pressure signals 138 to determine the current location of the master object on sensor array 120 and generates position signal 142 representing the position of the master object. Additionally or alternatively, processor 140 determines the magnitude and direction of the movement vector representing movement of the master object from its position at the beginning of a time interval to its position at the end of the time interval to generate movement signal 144 representing the movement of the master object.

For example, in an embodiment, processor 140 operates in response to pressure signals 138 to determine the movement vector from the incremental change ($\Delta x$, $\Delta y$) in the Cartesian coordinates of the master object between the beginning of the time interval and the end of the time interval. Processor 140 outputs movement signal 144 representing the movement vector to host device 10. In response to movement signal 144, host device 10 moves the slave object from a current position having Cartesian coordinates (x, y) to a new position having Cartesian coordinates (x+$\Delta x$, y+$\Delta y$). In the example shown in FIG. 1, host device 10 moves cursor 11 from the current position having Cartesian coordinates (x, y) on display 12 to the new position having Cartesian coordinates (x+$\Delta x$, y+$\Delta y$) on display 12 in response to movement signal 144.

As described above, processor 140 operates in response to pressure signals 138 and an appropriate position-indicating metric to determine the current position of the master object on sensor array 120, and generates position signal 142 indicative of the determined position of the master object, as described above. This allows the user to make small and precise movements of the slave object by simply rocking his or her finger on sensor array 120 to change the pressure signal used by processor 140 to determine the location of the master object.

Memory device 146 may additionally store a click threshold value (not shown) that enables processor 140 to detect a click event performed by the user using the master object. As used in this disclosure, the term "click event" refers to the selection operation, execution operation or drag function typically performed by operating the left button of a conventional computer mouse. By way of example, but not limitation, click events include a single click function, a double click function and a click and drag function. Moreover, instead of performing "click" operations using a separate input device such as a button, as is done by the user of a conventional touchpad device, the user can implement a click event merely by increasing the pressure applied to sensor array 120 beyond the click threshold value. To detect a click event, processor 140 compares pressure signals 138 received from sensor array 120 with the click threshold value, and detects a click event when the value of at least one of the pressure signals exceeds the click threshold value.

Since the pressure applied to sensor array 120 during normal operation varies from user-to-user, and may additionally vary over time with a given user, processor 140 may additionally monitor the pressure the user applies to sensor array 120 during normal (non-click) operation of the position sensor and, in response to the results of monitoring the pressure, dynamically adjust the click threshold value. The pressure applied by the user is represented by the values of the pressure signals supplied by sensor array 120 to processor 140. For example, the processor may adjust the click threshold value to a predetermined percentage of the average pressure applied by the user during the previous predetermined period of time of normal operation.

Processor 140 can be implemented as a microprocessor, a micro-controller, a digital signal processor, a microcomputer, a central processing unit, a field programmable gate array, a programmable logic device, a state machine, a logic circuit, and/or any device capable of performing the functions described above. Memory device 146 can be any type of memory device suitable for use with processor 140. Many of the above-described devices operate in response to a set of instructions 148 stored in memory device 146. In an example, instructions 148 include an algorithm for determining the position of the master object on sensor array 120 from the pressure signals and for generating position signal 142 indicating the position of the master object. Instructions 148 can additionally include an algorithm for generating movement signal 144 representing a change in the position of the master object on sensor array 120 during a predetermined time interval. In another embodiment, the above-mentioned algorithms are stored in processor 140, and memory device 146 stores data used by processor 140.

Figure 3A:
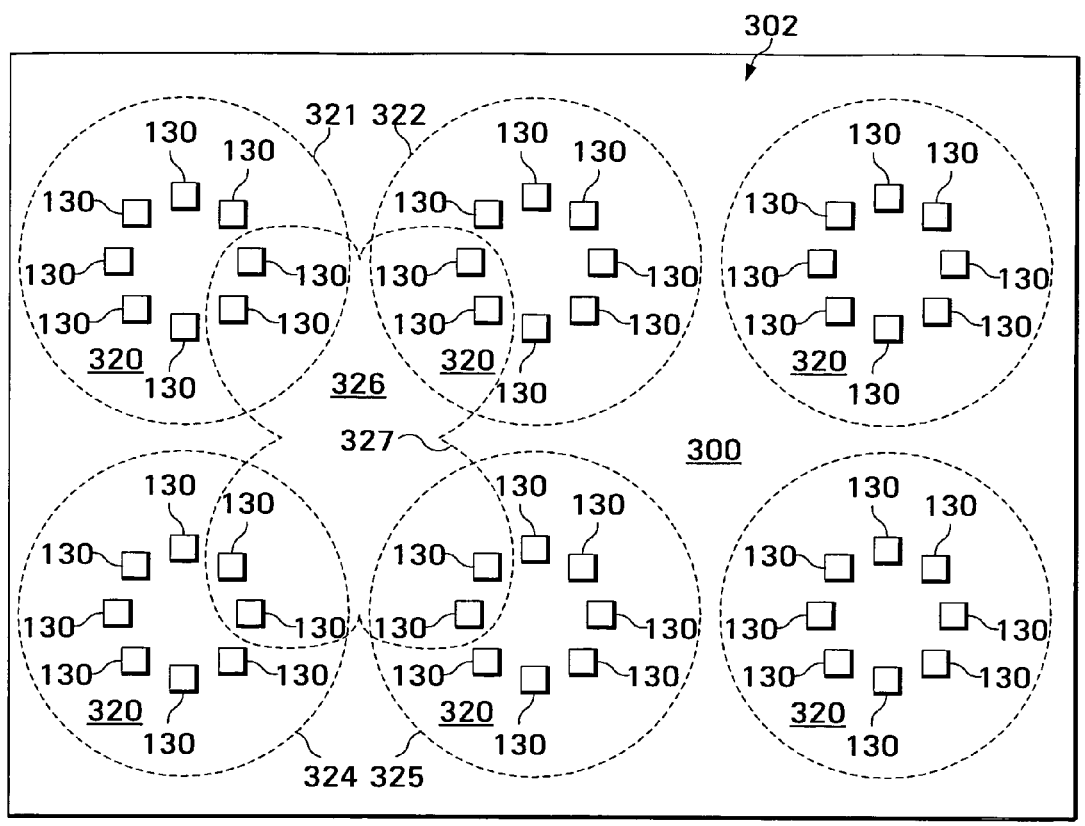
FIG. 3A is a plan view showing the sensing area of an example of a position sensor in accordance with another embodiment of the invention.

FIG. 3A is a plan view showing the sensing area 300 of an example of position sensor 100 in accordance with another embodiment of the invention. In the example shown in FIG. 3A, circular sensor arrays 320 arranged in a rectangular array 302 are located in sensing area 300. Each circular sensor array 320 is composed of pressure sensors 130 arrayed around the circumference of a circle. Each pressure sensor 130 constituting circular sensor arrays 320 is capable of generating a pressure signal that quantifies the pressure applied to the pressure sensor with greater than single-bit resolution, as described above with reference to FIG. 2.

Each circular sensor array 320 constitutes the sensor array of a respective position sensor. Additionally, rectangular array 302 of circular sensor arrays 320 constitutes the sensor array of a position sensor having a coarser spatial resolution than the circular sensor array-based position sensors. Thus, with reference to the position sensor shown in FIG. 3A, rectangular array 302 is the sensor array of a coarse position sensor and each circular pressure sensor array 320 is the sensor array of a respective fine position sensor.

Although not specifically shown in FIG. 3A, sensing area 300 includes a contact layer over sensor arrays 320. The contact layer is similar to contact layer 706 described below with reference to FIG. 7A. The contact layer has an exposed surface that is contacted by the master object (e.g., a user's finger or a stylus). The contact layer transfers the pressure applied by the master object to the underlying pressure sensor(s). In one embodiment, the exposed surface of the contact layer has a ratio between its static coefficient of friction and its sliding coefficient of friction greater than a threshold ratio. The threshold ratio is selected to optimize the user's ability to maintain his or her finger in contact with one or more of the circular sensor arrays 320 while performing the above-mentioned rocking motion.

In an example of the use of the position sensor embodiment shown in FIG. 3A to control the position of a slave object, the user makes large-scale changes in the position of the slave object simply by sliding his or her finger, as the master object, over the surface of sensing area 300, as in a conventional touchpad. Once the slave object has been roughly positioned, the user performs the above-described rocking motion using his or her finger to provide fine, precise control over the position of the slave object. On a macro scale, static friction between the user's finger and the contact surface of sensing area 300 holds the user's finger in position on sensing area 300. On a micro scale, the rocking motion produces a subtle shift in the pressure distribution applied by the user's finger to the sensing area. The circular sensor arrays detect this shift in the pressure distribution and provide respective changes in the pressure signals. The changes in the pressure signals change the position signal and/or movement signal.

In one exemplary operation, the rocking motion of the user's finger occurs relative to a single one of the circular sensor arrays 320 in sensing area 300. The processor, similar to processor 140 shown in FIG. 2, associated with the circular sensor array operates in response to pressure signals generated by the pressure sensors 130 constituting the circular sensor array to determine the position of the user's finger relative to the circular sensor array. The user rocking his or her finger on the circular sensor array changes the pressure signals generated by the pressure sensors constituting the circular sensor array, and the position of the user's finger indicated by the position signal varies. For example, the user rocking his or her finger changes the position in the circular array of the pressure sensor whose pressure signal indicates the greatest applied pressure.

In another exemplary operation, the rocking motion of the user's finger occurs relative to two or more of the circular sensor arrays 320. In this case, the processor, similar to processor 140 shown in FIG. 2, associated with one of the circular sensor arrays synthesizes a virtual array of pressure sensors 130 from those of the pressure sensors in the two or more of the circular sensor arrays to which the user's finger applies pressure greater than a threshold pressure. In this case, the processor determines the position of the user's finger in sensing area 300 in response to the pressure signals generated by the pressure sensors 130 constituting the virtual pressure sensor.

For example, referring to FIG. 3A, when the user's finger is positioned over circular sensor arrays 321, 322, 323 and 324 such that at least one of the pressure sensors 130 constituting each of the circular sensor arrays 321, 322, 323 and 324 produces a respective pressure signal indicating an applied pressure greater than zero or another threshold pressure, the processor operates in response to the pressure signals generated by such pressure sensors 130 as if the pressure signals were generated by a virtual sensor array 326 whose boundary is indicated by a broken line 327. The processor determines the position of the user's finger in sensing area 300 in response to the pressure signals generated by the pressure sensors 130 constituting virtual sensor array 326 and the appropriate position-indicating metric, and generates a position signal indicating the position of the user's finger.

In another exemplary operation, a processor (not shown), similar to processor 140 shown in FIG. 2, associated with sensor array 302 generates a coarse position signal indicating the position in sensing area 300 of the circular sensor array 320 or virtual sensor array 326 contacted by the master object. Additionally, a processor (not shown), similar to processor 140 shown in FIG. 2, associated with the circular sensor array or virtual sensor array identified by the coarse position signal as being contacted by the master object generates a fine position signal in response to the spatial pressure distribution detected by the pressure sensors 130 constituting the circular sensor array 320 or the virtual sensor array 326. For example, as the user rocks his or her finger on one of the circular sensor arrays 320, the pressure signals generated by the pressure sensors constituting the circular sensor array vary. For example, the identity of the pressure sensor 130 producing the pressure signal indicating the greatest applied pressure varies. The resulting small and precise changes in the position of the user's finger indicated by the position signal obtained by combining the coarse position signal and the fine position signal enables the user to control the position of the slave object over a wide range with great precision.

In an alternative configuration of sensing area 300 shown in FIG. 3A, only one circular sensor array 320 is located within sensing area 300. Examples of possible locations of the single circular sensor array include, but are not limited to, the center of sensing area 300, one side of sensing area 300, one corner of sensing area 300 and an extension beyond the generally rectangular shape of sensing area 300 shown. In another alternative configuration of sensing area 300, two circular sensor arrays 320 are located at respective, mutually-different locations within sensing area 300. Examples of possible locations of the two circular sensor arrays include two corners of sensing area 300, adjacent one or more sides of sensing area 300, other spaced-apart locations within sensing area 300 and one or more extensions beyond the generally rectangular shape of sensing area 300 shown. In a further alternative, sensing area 300 has more than two circular sensor arrays that are not arrayed in a rectangular array.

In the above-described alternative configurations of sensing area 300, all or part of sensing area 300 not occupied by circular sensor array(s) 320 is occupied by an additional position sensor (not shown) having a coarser spatial resolution than the pressure sensor(s) incorporating circular sensor array(s) 320. The additional position sensor is a conventional position sensor, for example, a pressure-sensitive position sensor based on a touchpad or a touch screen. Alternatively, the additional position sensor is similar to the embodiment of position sensor 100 described above with reference to FIG. 2, but its constituent pressure sensors are substantially larger in area than the pressure sensors constituting the circular pressure sensor array(s).

In a further alternative configuration of sensing area 300, one or more circular sensor arrays 320 and the above-described additional pressure-sensitive position sensor (not shown) are arranged in tandem between the contact surface and an underlying substrate. The additional pressure-sensitive position sensor is used to determine the location of the master object on sensing area 300 with a relatively coarse spatial resolution, and the circular sensor array 320 is additionally used to determine the location of the master object on sensing area 300 with a finer spatial resolution. Identifying the location of the master object on sensing area 300 using the additional pressure-sensitive position sensor allows the number of pressure sensors 130 constituting each circular sensor array 320 to be reduced and/or allows the number of circular sensor arrays 320 in sensing area 300 to be reduced. An example of such an embodiment will be described below with reference to FIGS. 7A and 7B.

In configurations of sensing area 300 in which one or more circular sensor arrays 320 occupy part of sensing area 300 and the remainder of sensing area 300 is occupied by the above-described additional position sensor having a coarser spatial resolution than the position sensor incorporating the circular sensor array(s), the user makes large-scale changes in the position of the slave object using the additional position sensor, then transfers his or her finger to the circular position sensor and uses the above-described rocking motion applied to the circular position sensor to perform precise positioning of the slave object.

Figure 3B:
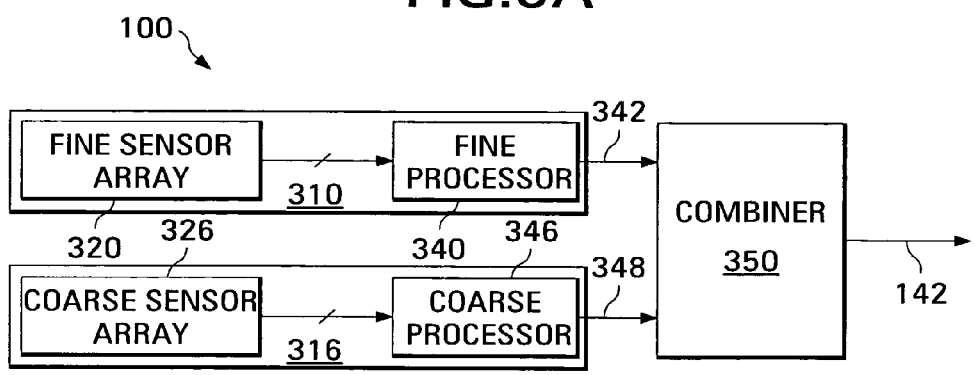
FIG. 3B is a block diagram of the electrical circuitry of the embodiment of the position sensor shown in FIG. 3A.

FIG. 3B is a block diagram of the electrical circuitry of an embodiment of position sensor 100 in which sensor arrays having different spatial resolutions are located in sensing area 300 shown in FIG. 3A. In FIG. 3B, position sensor 100 is composed of a fine position sensor 310, a coarse position sensor 316 and a combiner 350. Fine position sensor is composed of a fine sensor array 320 and a fine processor 340 and generates a fine position signal 342. Coarse position sensor 316 is composed of a coarse sensor array 326 and a coarse processor 346 and generates a coarse position signal 348. Coarse sensor array 326 has a coarser spatial resolution than fine sensor array 320.

In the example shown, coarse sensor array 326 is embodied as a sensor array similar to the embodiment of sensor array 100 shown in FIG. 2 with pressure sensors that are larger in area than the pressure sensors constituting fine sensor array 320. The pressure signals generated by the pressure sensors (not shown) constituting coarse sensor array 326 are fed to coarse processor 346. Coarse processor 346 operates in response to the pressure signals and an appropriate position-indicating metric to generate coarse position signal 348. Alternatively, coarse position sensor 316 can be realized by configuring sensing area to include multiple circular sensor arrays 320, each including a respective circular array of pressure sensors 130, as described above in connection with FIG. 3A, or to include another pressure-sensitive device (e.g., a touchpad or a touch screen). Coarse sensor array 326 is located alongside fine sensor array 320 or may be composed of multiple fine sensor arrays 320, as described above.

Fine sensor array 320 is described above with reference to FIG. 3A. The pressure signals generated by fine sensor array 320 are fed to fine processor 340 that operates in response to the pressure signals and an appropriate position-indicating metric to generate fine position signal 342. A single processor (not shown) may be used to perform the functions of fine processor 340, coarse processor 342 and combiner 350.

Combiner 350 operates to combine coarse position signal 348 generated by coarse position sensor 316 and fine position signal 342 generated by fine position sensor 310 to generate position signal 142. Combiner 350 superposes fine position signal 342 on coarse position signal 348 to generate position signal 142 that indicates the position of the master object on sensing area 300 with a spatial resolution equal to that of fine position sensor 310. In an example in which fine sensor array has a spatial resolution of $2^n$ of that of coarse sensor array 302, where n is an integer, coarse position signal 348 provides all but the n less-significant bits of position signal 142 and fine position signal 342 provides the n less-significant bits of position signal 142.

To prevent pressure applied inadvertently to one of the sensor arrays 320 and 326 from moving the slave object, combiner 350 can be configured to respond to changes in only one of the position signals 342 and 348 at a time. For example, combiner 350 holds the value of fine position signal 342 while coarse position signal 348 is changing, and vice versa. Alternatively, combiner 350 may hold the value of one of the position signals for a predetermined time after the value of the other control signal stops changing. This provides more consistent behavior notwithstanding any gain difference between position signals 342 and 348. In this context, gain refers to the change in the respective position signal resulting from a given change in the position of the master object.

Figure 4:
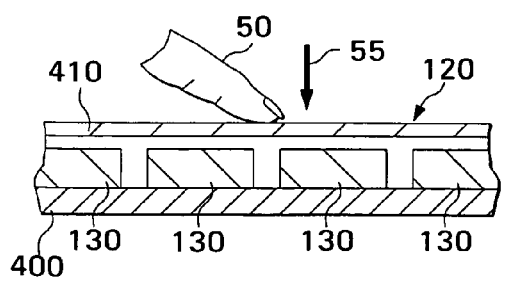
FIG. 4 is a cross-sectional view showing part of a first example of a sensor array that constitutes part of embodiments of a pressure distribution sensor in accordance with the invention.

FIG. 4 is a cross-sectional view showing part of a first example of sensor array 120 that constitutes part of embodiments of pressure distribution sensor 100 in accordance with the invention. Sensor array 120 is composed of a substrate 400, a contact layer 410 against whose surface the master object (e.g., user's finger 50) is placed and pressure sensors 130 located between substrate 400 and contact layer 410. Each pressure sensor 130 measures the pressure 55 applied by the master object in a direction generally orthogonal to the surface of contact layer 410. Thus, as the master object comes in contact with the surface of contact layer 410, each pressure sensor 130 generates a pressure signal indicative of the pressure 55 applied by the master object to the surface of layer 410 at the location of the pressure sensor. Typically, some of the pressure sensors, i.e., those not contacted by the master object, generate a pressure signal indicative of an applied pressure of zero.

Each pressure sensor 130 comprises a material having an electrophysical property that varies as a function of applied pressure. For example, in one embodiment, pressure sensors 130 are formed of piezoelectric material. In another embodiment, pressure sensors 130 are formed of electret material.

Figure 5:
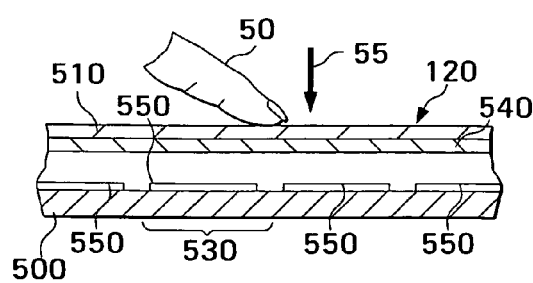
FIG. 5 is a cross-sectional view showing part of a second example of a sensor array that constitutes part of embodiments of a pressure distribution sensor in accordance with the invention.

FIG. 5 is a cross-sectional view showing part of a second example of sensor array 120 that constitutes part of embodiments of pressure distribution sensor 100 in accordance with the invention. Sensor array 120 is composed of a substrate 500, a contact layer 510 against whose surface the master object (e.g., user's finger 50) is placed, an electret layer 540 juxtaposed with contact layer 510 and spaced from substrate 500, and electrodes 550 arrayed on substrate 500 facing electret layer 540. Each electrode 550 and the overlying portion of electret layer 540 collectively constitute a respective pressure sensor, an exemplary one of which is shown at 530.

Electret layer 510 is an electrically-polarized plastic film. In pressure sensor 530, the portion of electret layer 510 overlying electrode 550 is capable of inducing a charge on electrode 550 in response to pressure 55 applied by the master object (e.g., user's finger 50) to the portion of contact layer 510 overlying the electrode. The electrode has capacitance that stores the induced charge. The stored charge is later read out by discharging the capacitance into column bus 136 (FIG. 0A).

Figure 6A:
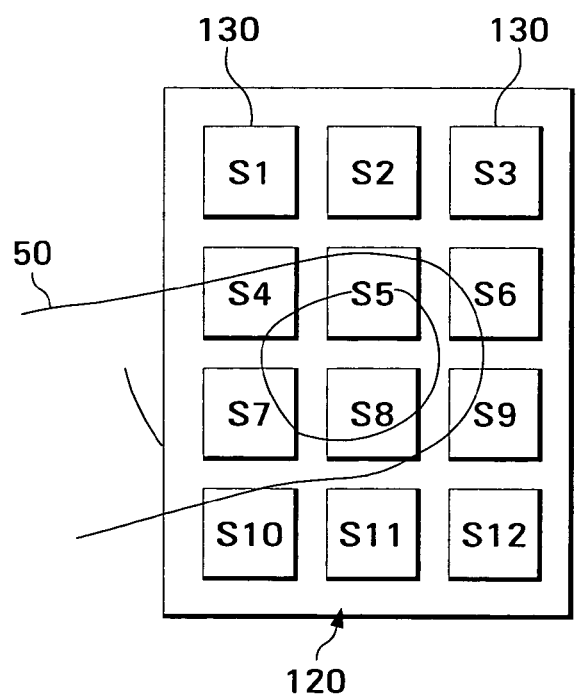
FIG. 6A is a plan view showing a master object applying pressure to several of the pressure sensors of the sensor array of a pressure distribution sensor in accordance with embodiments of the invention.
Figure 6B:
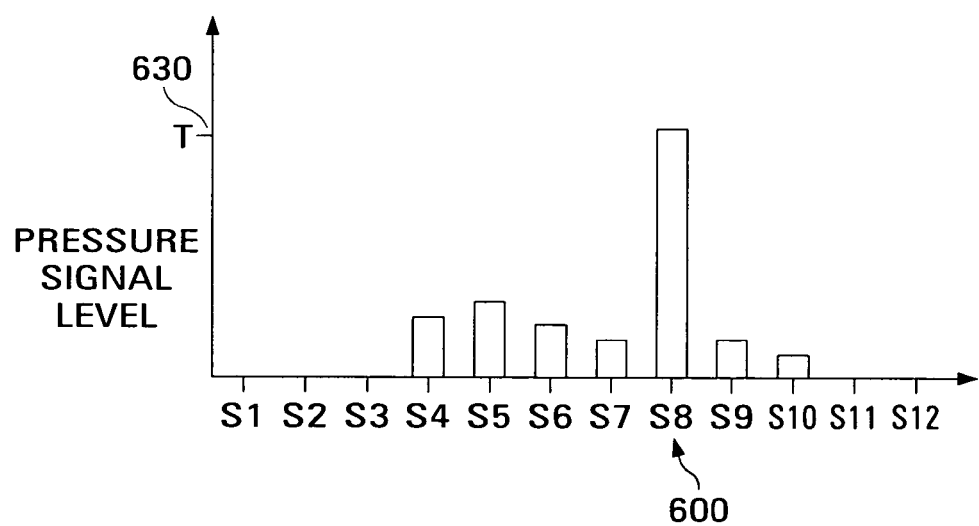
FIG. 6B is a bar graph showing the levels of the pressure signals resulting from the pressure distribution applied to the sensor array in the example shown in FIG. 6A.

FIGS. 6A and 6B illustrate an example of the operation of sensor array 120 in accordance with an embodiment of the invention. FIG. 6A is a plan view showing a master object applying pressure to several of the pressure sensors 130 of an embodiment of sensor array 120. In the example shown, sensor array 120 is composed of only twelve pressure sensors 130 to simplify the drawing, and the master object is a user's finger 50.

FIG. 6B is a bar graph showing the level of the pressure signal output by each of the pressure sensors 130 of sensor array 120 shown in FIG. 6A in response to the pressure applied by finger 50. FIG. 6B can be regarded as representing the spatial distribution of the pressure applied to sensor array 120.

The pressure sensors are individually identified as pressure sensors S1-S12. In FIG. 6A, finger 50 is shown in contact with a subset of the pressure sensors S1-S12 and applies pressure to the pressure sensors in the subset. Each pressure sensor 130 generates a respective pressure signal in response to the pressure applied by the finger. In the example shown in FIG. 6A, finger 50 does not contact pressure sensors S1-S3 and pressure sensors S11-S12. As a result, the levels of the pressure signals generated by pressure sensors S1-S3 and S11-S12 are zero, as shown in FIG. 6B. However, finger 50 applies pressure to pressure sensors S4-S10. As a result, pressure sensors S4-S10 each produce a respective non-zero pressure signal indicative of the pressure that finger 50 applies to it, also as shown in FIG. 6B.

In response to the pressure signals received from sensor array 120, the locations in sensor array 120 of the respective pressure sensors 130 that generate the respective pressure signals, and an appropriate position-indicating metric, processor 140 (FIG. 2) determines the position 600 of finger 50 on sensor array 120. In some embodiments, processor 140 identifies the pressure sensors 130 that generate non-zero pressure signals (i.e., S4-S10) prior to determining location 600. In one example, as shown in FIG. 6B, the position 600 of finger 50 on sensor array 120 is identified as corresponding to the location in the sensor array of pressure sensor S8. Pressure sensor S8 is the pressure sensor that generates the pressure signal having the highest level.

Also shown in FIG. 6B is a threshold level 630 for use in detecting a click event. The level of the pressure signal produced by pressure sensor S8 in FIG. 6B is greater than threshold level 630. As a result, processor 140 generates a signal (not shown) notifying host device 10 of the occurrence of a click event at the detected location 600 of finger 50 on sensor array 120.

Figure 7A:
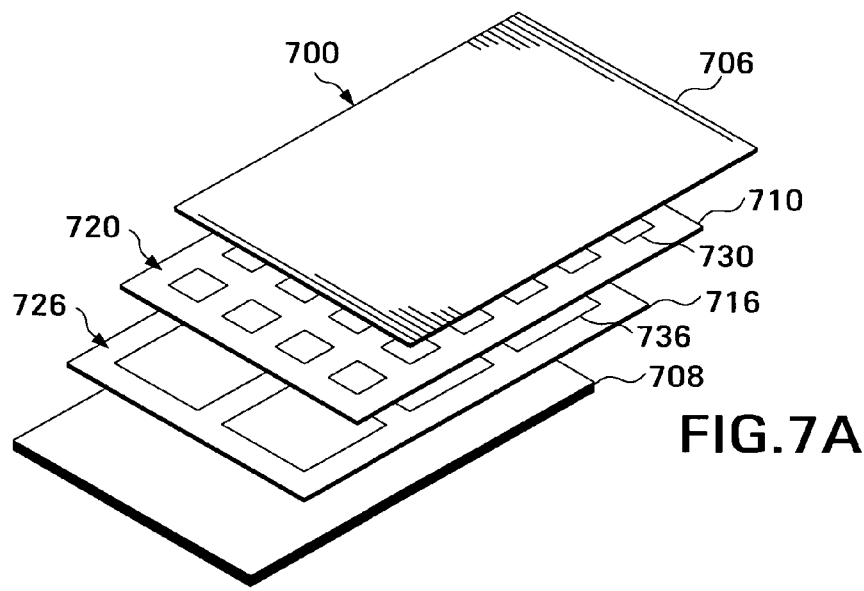
FIG. 7A is an exploded view showing an example of a position detector comprising a fine position detector and a coarse position detector arranged in tandem in accordance with an embodiment of the invention.
Figure 7B:
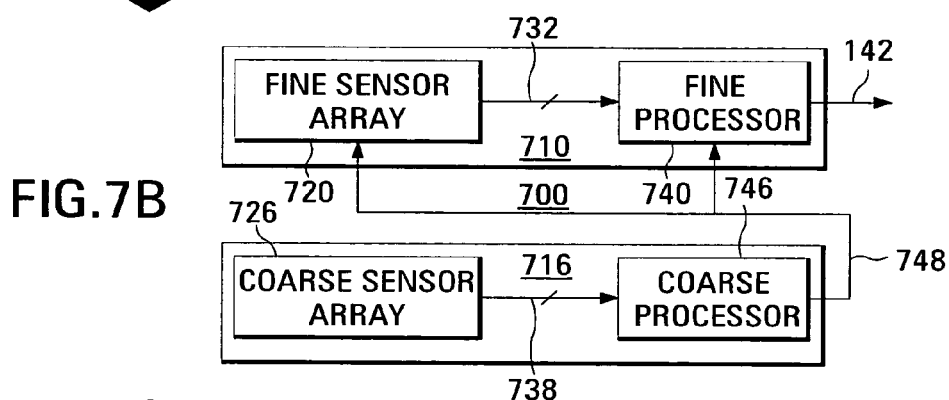
FIG. 7B is a block diagram showing the electrical circuitry of the embodiment of the position detector shown in FIG. 7A.

FIG. 7A is an exploded view of part of a position sensor 700 in accordance with another embodiment of the invention. FIG. 7B is a schematic diagram of pressure sensor 700. Position sensor 700 is composed of a fine position sensor 710, a coarse position sensor 716, a contact layer 706 and a substrate 708. Coarse position sensor 716 has a coarser spatial resolution than fine position sensor 710. Position sensor 700 generates a position signal 142 that represents the position of the master object with a lower processing overhead than a conventional position sensor having the same spatial resolution. Position sensor 700 additionally has the ability to be operated using the above-described rocking motion.

Fine position sensor 710 is similar to the embodiment of fine position sensor 100 described above with reference to FIG. 2, and is composed of a fine sensor array 720 and a fine processor 740. Fine sensor array 720 is composed of an array of pressure sensors each of which generates a respective pressure signal in response to applied pressure. The pressure signal quantifies the applied pressure with greater than single-bit resolution. An exemplary pressure sensor of fine sensor array 720 is shown at 730. Fine sensor array 720 differs from sensor array 120 shown in FIG. 2 in that the operation of its row selector and column decoder, similar to row selector 172 and column decoder 174 shown in FIG. 2, is controlled by coarse position sensor 716 so that they scan a selected sub-array of the pressure sensors constituting fine sensor array 720, as will be described in more detail below.

As noted above, coarse position sensor 716 has a coarser spatial resolution than fine position sensor 710. In some embodiments, coarse position sensor 716 is a pressure-sensitive position sensor. In some of such embodiments, coarse position sensor 716 is a conventional pressure-sensitive position sensor, such as a touchpad or a touch screen. In the example shown, coarse position sensor 716 is similar to the embodiment of fine position sensor 100 described above with reference to FIG. 2, and is composed of a coarse sensor array 726 and a coarse processor 746. Coarse sensor array 726 is composed of an array of pressure sensors each of which generates a respective pressure signal in response to applied pressure. The pressure signal quantifies the applied pressure with greater than single-bit resolution. An exemplary pressure sensor of coarse sensor array 726 is shown at 736. The pressure sensors of coarse sensor array 726 are substantially larger in area than the pressure sensors of fine sensor array 720.

Fine position sensor 710 and coarse position sensor 716 are arranged in tandem between contact layer 706 and substrate 708 such that pressure applied by the master object to contact layer 706 is applied to both fine position sensor 710 and coarse position sensor 716. In the example shown, fine sensor array 720 of fine position sensor 710 is located adjacent contact layer 706 and coarse sensor array 726 of coarse position sensor 716 is located between fine sensor array 720 and substrate 708. Alternatively, coarse position sensor 716 may be located adjacent contact layer 706 and fine position sensor 710 is located between coarse position sensor 716 and substrate 708.

Coarse position sensor 716 generates a coarse position signal 748 in response to the master object applying pressure to contact layer 706. Coarse position control signal 748 indicates the location of the master object on position sensor 700 with a coarse spatial resolution. In the example shown, coarse processor 746 determines the position of the master object in response to pressure signals 738 received from coarse sensor array 726 and an appropriate position-indicating metric, in a manner similar to that described above. The location of the master object indicated by coarse position signal 748 can be coarsely quantized. Accordingly, the appropriate position-indicating metric can be the location in coarse sensor array 726 of the pressure sensor whose pressure signal indicates the greatest pressure. Coarse position sensor 716 provides coarse position signal 748 to control inputs of fine sensor array 720 and fine processor 740.

In fine sensor array 720 that forms part of fine pressure sensor 710, coarse position signal 748 generated by coarse position sensor 716 controls the operation of the row selector and column decoder, corresponding to row selector 172 and column decoder 174 shown in FIG. 2, to define the location in fine sensor array 720 of a sub-array of pressure sensors whose pressure signals 732 are output by fine sensor array 720 to fine processor 740. This allows the pressure sensors in fine sensor array 720 scanned by the row selector and column decoder to be reduced to those located in a sub-array of fine sensor array 720 in which the master object is known (from the coarse position signal) to be located. The sub-array is typically substantially smaller in size than fine sensor array 710.

Scanning a sub-array instead of all of fine sensor array 720 allows one or more of the following to be attained: (1) an increase in the scan rate of the pressure sensors in the sub-array of fine sensor array 720, (2) an increase in the integration time of the pressure sensors in the sub-array of fine sensor array 720, and (3) a decrease in the power consumption of fine sensor array 720. An increased scan rate increases the accuracy with which position signal 142 tracks movement of the master object. An increased integration time ameliorates the reduced signal-to-noise ratio of the pressure signals resulting from the smaller size of the pressure sensors constituting fine sensor array 720. Additionally, scanning only a sub-array of fine sensor array 720 allows fine processor 740 to be simplified because the number of pressure signals 732 processed by the processor is equal to the number of pressure sensors in the sub-array rather than the total number of pressure sensors constituting fine sensor array 720.

Fine position sensor 710 generates position signal 142 in response to the master object applying pressure to contact layer 706. Position signal 142 indicates the location of the master object on position sensor 700 with a fine spatial resolution. In response to the pressure signals 732 received from the pressure sensors in the sub-array of fine sensor array 720 and an appropriate position-indicating metric, fine processor 740 determines the position of the master object on the sub-array of fine sensor array 720. The fine processor determines the position of the master object relative to a reference position in the sub-array. The reference position is that position in the sub-array whose location in fine sensor array 720 is defined by coarse position signal 748. Fine processor 740 then combines the location of the sub-array indicated by coarse position signal 748 with the position of the master object in the sub-array to determine the position of the master object on position sensor 700 with high spatial resolution. Fine processor 740 generates position signal 142 indicting the position of the master object on position sensor 700 with fine spatial resolution.

Figure 8:
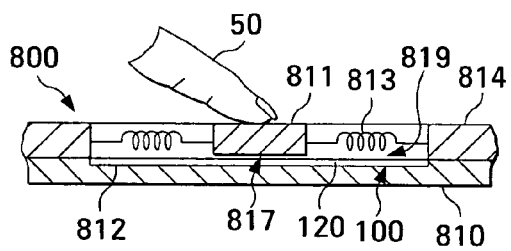
FIG. 8 is a cross-sectional view showing an example of a slidepad-based position detector in accordance with an embodiment of the invention.

FIG. 8 is a cross-sectional view of an example of a slidepad-based position sensor 800 in accordance with an embodiment of the invention. Slidepad-based position sensor 800 is based on the basic slidepad structure disclosed by Harley et al. in United Stated patent application publication No. 2005 0 110 755, assigned to the assignee of this disclosure and incorporated by reference. Slidepad-based position sensor 800 may be incorporated into a host device in a manner similar to position sensor 100 shown in FIG. 1. Slidepad-based position sensor 800 is composed of a puck 811, position sensor 100, and a substrate 810. In response to a lateral force applied to it, puck 811 is moveable within a puck field of motion 819 over position sensor 100. In the example shown in FIG. 8, the lateral force is applied by a user's finger 50. Alternatives include the user's thumb, more than one of the user's fingers, and the user's thumb and one of the user's fingers. In this embodiment, puck 811 constitutes the master object whose position is determined by position sensor 100.

Sensor array 120 of position sensor 100 is located on or over the surface 812 of substrate 810. The pressure sensors (not shown) of sensor array 120 individually measure the pressure applied by puck 811 to surface 812 as a result of force applied by finger 50 to puck 811 in a direction generally orthogonal to surface 812. When the user releases puck 811 by lifting finger 50, springs 813 that connect puck 811 to the perimeter 814 of puck field of motion 819 return the puck to a center position 817. The perimeter 814 of puck field of motion 819 is typically connected to the surface of the host device of which slidepad-based position controller 800 forms part.

A processor (not shown), similar to processor 140 described above with reference to FIG. 2, receives the pressure signals generated by the pressure sensors constituting sensor array 120 and in response to the pressure signals and an appropriate pressure-indicating metric, determines the position of puck 811, as the master object, in puck field of motion 819. The processor delivers to the host device a position signal (not shown) that indicates the position of the puck in the puck field of motion.

Figure 9:
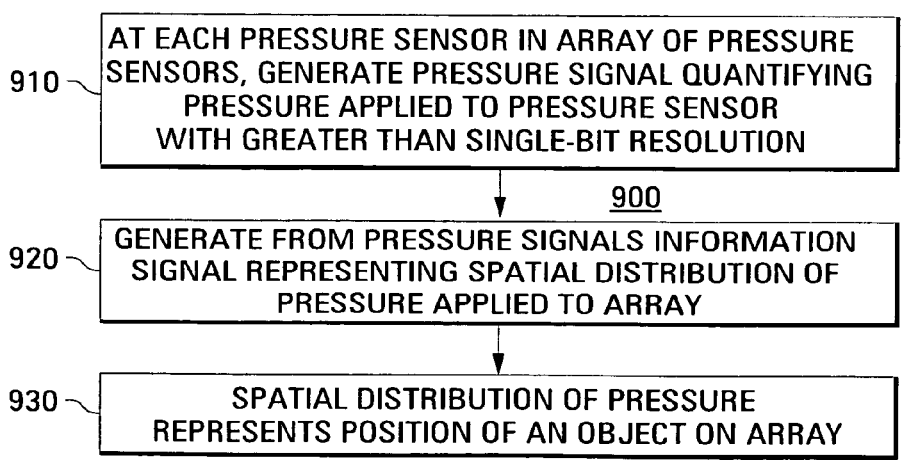
FIG. 9 is a flow chart illustrating an example of a pressure distribution sensing method in accordance with an embodiment of the invention.

FIG. 9 is a flow chart illustrating an example of a pressure distribution indicating process 900 in accordance with an embodiment of the invention. At block 910, a pressure signal is generated at each pressure sensor in an array of pressure sensors. The pressure signal quantifies the pressure applied to the pressure sensor with greater than single-bit resolution. At block 920, an information signal representing the spatial distribution of the pressure applied to the array of pressure sensors is generated from the pressure signals. FIG. 9 additionally shows optional block 920 in which the spatial distribution of the pressure applied to the arrays represents the position of an object on the array.

This disclosure describes the invention in detail using illustrative embodiments. However, the invention defined by the appended claims is not limited to the precise embodiments described.

We claim:

1. An apparatus, comprising:
   a fine sensor array comprising an array of fine pressure sensors and a coarse sensor array comprising an array of coarse pressure sensors wherein the fine sensor array and the coarse sensor array are positioned to overlap, the fine and coarse pressure sensors operable to produce respective pressure signals in response to pressure applied thereto, at least some of the pressure signals quantifying the pressure with greater than single-bit resolution, the coarse sensor array having a different spatial resolution than the fine sensor array; and
   a processor operable in response to the pressure signals to generate an information signal representing a spatial distribution of pressure applied to at least one of the fine sensor array and the coarse sensor array.

2. The apparatus of claim 1, in which the information signal represents the position in the fine sensor array of one of the fine pressure sensors producing the greatest of the pressure signals from the fine sensor array.

3. The apparatus of claim 1, in which the information signal represents the position in the fine sensor array of the centroid of a region of the fine pressure sensors each producing a respective pressure signal representing the same pressure applied thereto.

4. The apparatus of claim 1, in which the information signal represents the position in the fine sensor array of the center of pressure of the pressure applied to the fine sensor array.

5. The apparatus of claim 1, in which the processor is operable to generate the information signal to represent a temporal change in the spatial distribution of the pressure applied to the fine sensor array.

6. The apparatus of claim 5, in which the temporal change in the spatial distribution of the pressure applied to the fine sensor array is a result of lateral movement relative to the fine sensor array of the spatial distribution of the pressure.

7. The apparatus of claim 5, in which the processor is further operable to compare the spatial distribution of pressure to a previous spatial distribution of pressure to determine a vector representing magnitude and direction of a change in the spatial distribution of pressure and to generate the information signal to represent the vector.

8. The apparatus of claim 5, in which the processor is further operable to compare the pressure signals to a threshold value and to indicate a click event when at least one of the pressure signals has a value greater than the threshold value.

9. The apparatus of claim 1, in which the fine sensor array is a rectangular array.

10. The apparatus of claim 9, in which the fine sensor array additionally comprises a circular array of pressure sensors.

11. The apparatus of claim 1, in which the fine sensor array is a circular array.

12. The apparatus of claim 1, in which at least some of the pressure signals quantify the pressure applied to the respective pressure sensors using one of three or more possible values.

13. The apparatus of claim 1 wherein the coarse pressure sensors are larger in area than the fine pressure sensors.

14. The apparatus of claim 1, in which the processor is further operable to ignore the position signal generated by one of the fine and coarse pressure sensors when pressure applied thereto is less than a threshold pressure.

15. The apparatus of claim 1, additionally comprising a contact surface associated with at least one of the fine and coarse sensor arrays, the contact surface having a static coefficient of friction and a sliding coefficient of friction, the static coefficient of friction and the sliding coefficient of friction having a ratio greater than a threshold ratio.

16. The apparatus of claim 1, further comprising a contact layer and a substrate, the fine and coarse sensor arrays being positioned between the contact layer and the substrate such that one of the fine and coarse sensor arrays is positioned between the substrate and the other sensor array.

17. The apparatus of claim 1, in which at least some of the fine and coarse pressure sensors comprise a material having an electrophysical property that depends on applied pressure.

18. The apparatus of claim 17, in which at least some of the fine and coarse pressure sensors comprise piezoelectric material.

19. The apparatus of claim 17, in which at least some of the fine and coarse pressure sensors comprise electrets.

20. The apparatus of claim 1, in which the apparatus constitutes part of one of a touchpad, a touch screen, a slidepad and a mouse.

21. A method, comprising:
   generating pressure signals quantifying pressure applied to pressure sensors in a fine sensor array of pressure sensors and a coarse sensor array of pressure sensors, the fine sensor array and coarse sensor array being positioned to overlap, at least some of the pressure signals quantifying the pressure with greater than single-bit resolution, the coarse sensor array having a different spatial resolution than the fine sensor array; and generating from the pressure signals an information signal representing a spatial distribution of pressure applied to at least one of the fine and coarse sensor arrays of pressure sensors.

22. The method of claim 21, additionally comprising generating, in response to successive values of the information signal, a signal representing a temporal change in the spatial distribution of the pressure applied to the fine sensor array of pressure sensors.

23. The method of claim 22, in which the temporal change in the spatial distribution of the pressure applied to the fine sensor array of pressure sensors is a result of lateral movement relative to the fine sensor array of the spatial distribution of the pressure.

24. The method of claim 23, additionally comprising moving an object in response to the signal representing the temporal change, the movement of the object following the lateral movement of the spatial distribution of the pressure.

25. The method of claim 21, further comprising detecting a click event in response to the signal representing the temporal change.

26. The method of claim 21, in which at least some of the pressure signals quantify the pressure applied to the pressure sensors using one of three or more possible values.

* * * * *